United States Patent
Sunata

(10) Patent No.: US 9,648,111 B2
(45) Date of Patent: May 9, 2017

(54) COMMUNICATION SYSTEM AND METHOD OF CONTROLLING THE SAME

(71) Applicant: CANON KABUSHIKI KAISHA, Tokyo (JP)

(72) Inventor: Jin Sunata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 14/734,585

(22) Filed: Jun. 9, 2015

(65) Prior Publication Data

US 2015/0365268 A1   Dec. 17, 2015

(30) Foreign Application Priority Data

Jun. 12, 2014 (JP) ................................. 2014-121851

(51) Int. Cl.

| | |
|---|---|
| *H04L 12/24* | (2006.01) |
| *H04L 29/08* | (2006.01) |
| *H04L 12/931* | (2013.01) |
| *H04L 12/26* | (2006.01) |
| *G06F 3/12* | (2006.01) |

(52) U.S. Cl.
CPC ............... *H04L 67/16* (2013.01); *G06F 3/12* (2013.01); *H04L 43/045* (2013.01); *H04L 43/0823* (2013.01); *H04L 49/35* (2013.01); *H04L 67/141* (2013.01); *H04L 67/2809* (2013.01)

(58) Field of Classification Search
CPC ....... H04L 49/35; H04L 67/141; H04L 67/16; H04L 67/2909; H04L 43/0823; H04L 43/045; G06F 3/12

USPC .......................................................... 709/203
See application file for complete search history.

(56) References Cited

U.S. PATENT DOCUMENTS

| | | | | |
|---|---|---|---|---|
| 2011/0314099 | A1* | 12/2011 | Imai | ..................... H04L 12/1822 709/204 |
| 2014/0293995 | A1* | 10/2014 | Tanaka | ................ H04L 65/1046 370/352 |
| 2015/0281500 | A1* | 10/2015 | Mori | .................. H04N 1/00928 358/1.15 |

(Continued)

FOREIGN PATENT DOCUMENTS

| | | |
|---|---|---|
| JP | H06-350723 A | 12/1994 |
| JP | 2005-208974 A | 8/2005 |
| JP | 2013-029922 A | 2/2013 |

*Primary Examiner* — Tu Nguyen
(74) *Attorney, Agent, or Firm* — Carter, DeLuca, Farrell & Schmidt, LLP

(57) ABSTRACT

A relay server generates a search condition in accordance with a connection request from the first terminal, and requests so that a management server searches for a state of the first terminal; when device information of the first terminal which is transmitted from the management server in response to the request is obtained, generates relay information and transmits the relay information to the first terminal; and controls communication between the first terminal and the second terminal in accordance with the relay information. The management server searches for state information of the first terminal in accordance with the requested search condition, and communicates the state information to the relay server as the device information; and in accordance with receiving the relay information from the first terminal, transmits the relay information to the second terminal.

8 Claims, 16 Drawing Sheets

(56) References Cited

U.S. PATENT DOCUMENTS

2015/0334350 A1* 11/2015 Tamura .............. H04L 12/1827
348/14.1

* cited by examiner

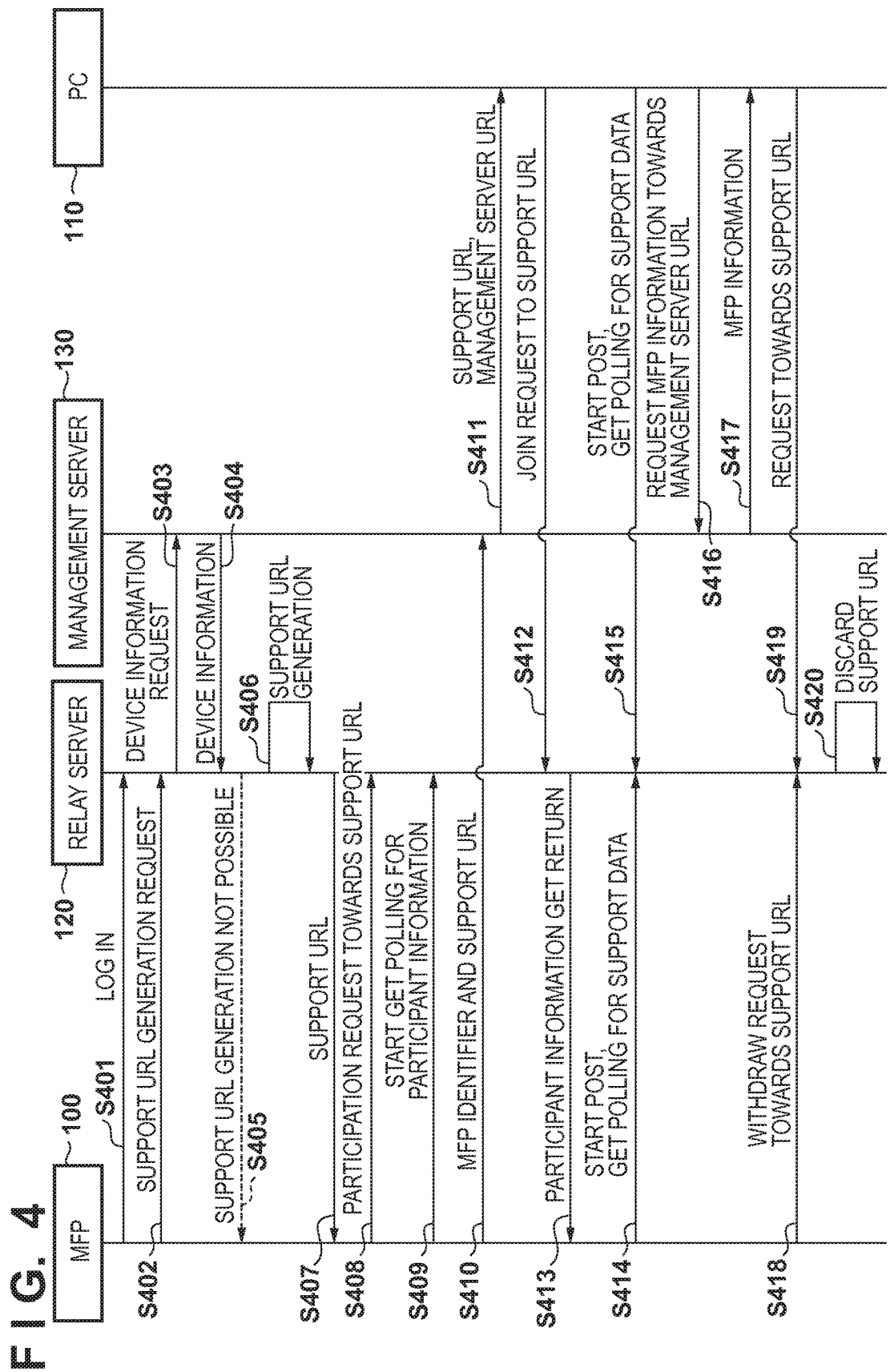

F I G. 5A
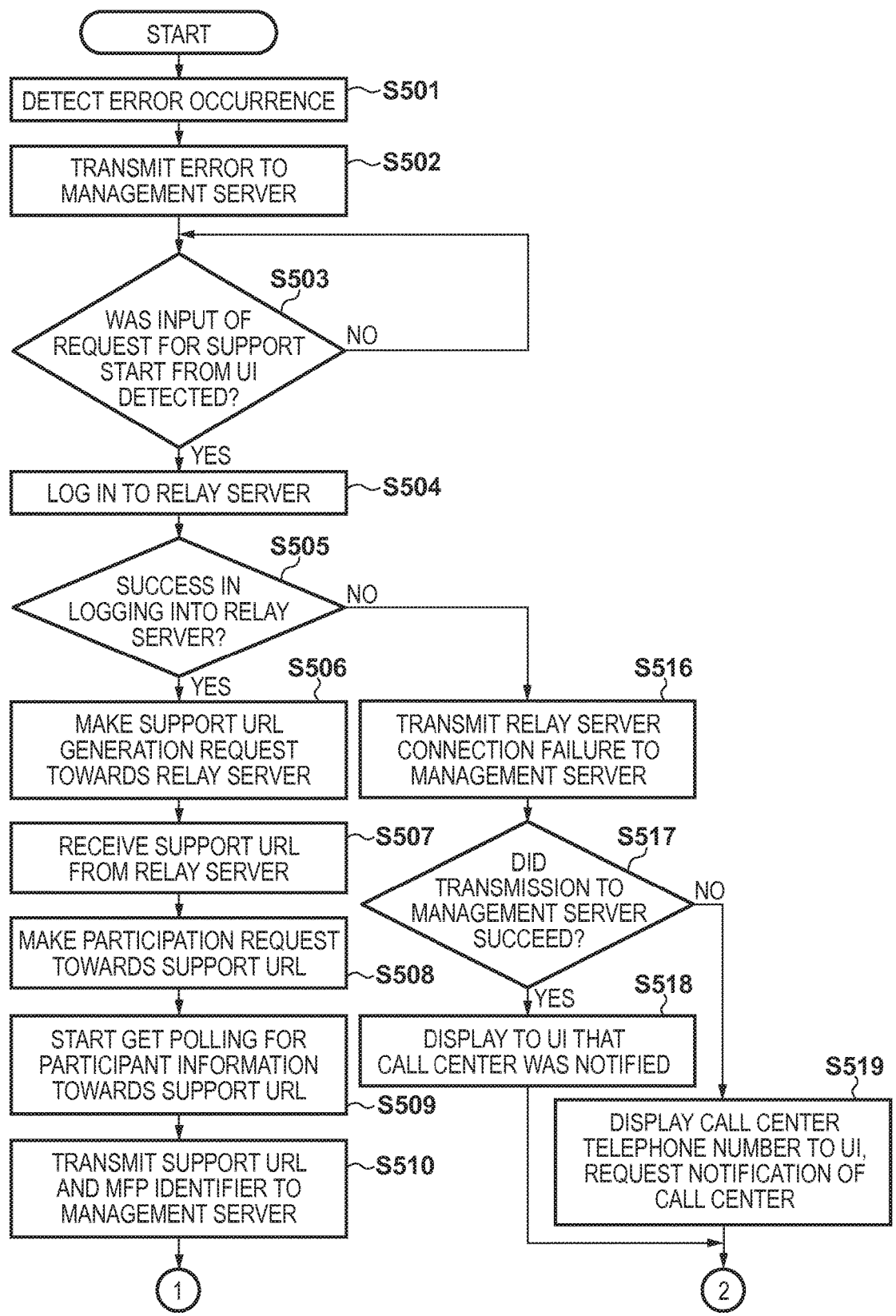

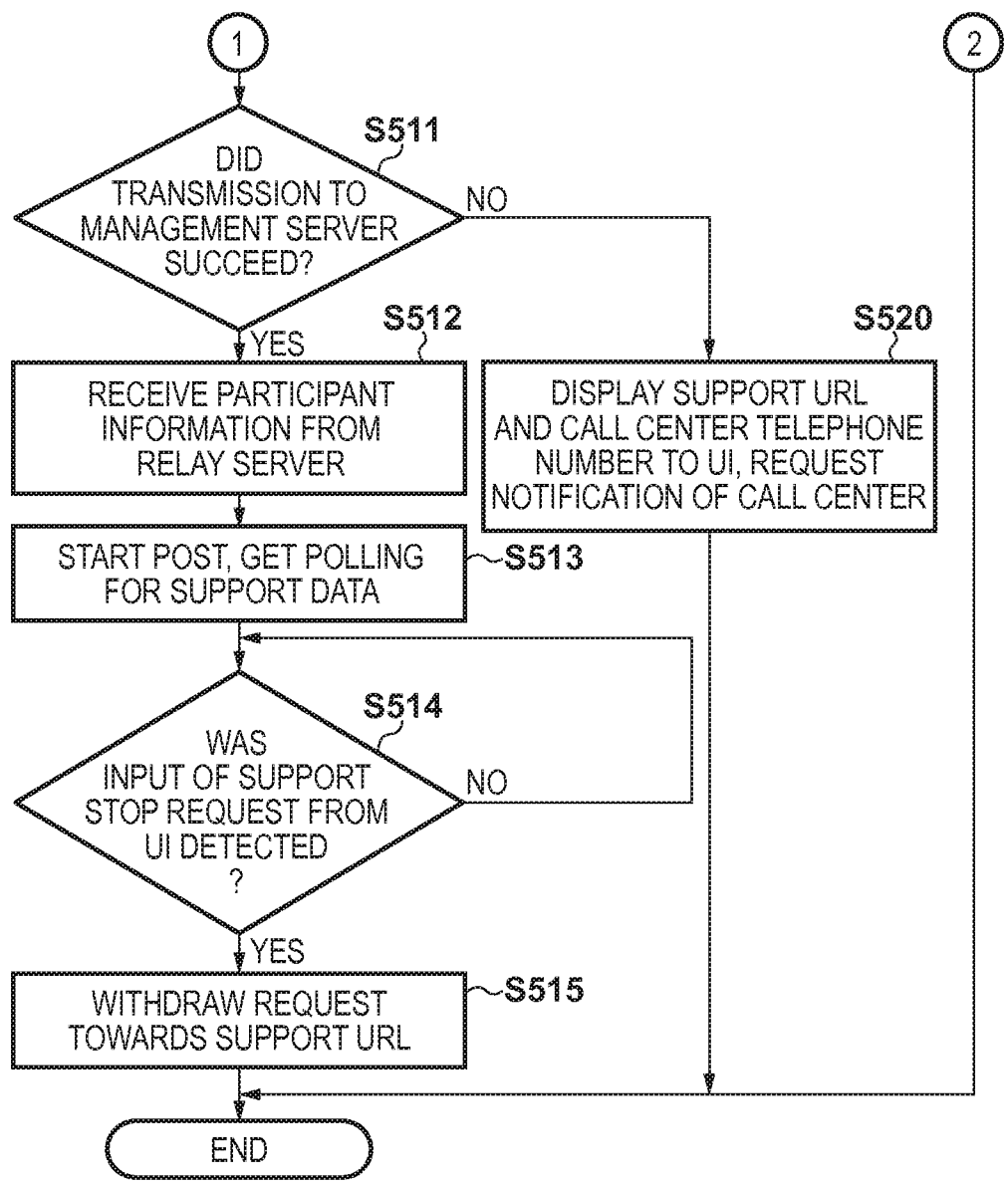

FIG. 13A

| UNUSED MEETING ROOM THRESHOLD |
|---|
| 50 |

FIG. 13B

| SEARCH CONDITION | VALIDITY FLAG |
|---|---|
| DEVICE UNITS | 1 |
| GROUP UNITS | 0 |
| SALES COMPANY UNITS | 0 |

FIG. 13C

| PRIORITY TARGET INFORMATION NUMBER | OCCURRENCE CODE |
|---|---|
| 1 | E003 |
| 2 | E005 |
| : | : |
| N-1 | E200 |
| N | JAM OCCURS FREQUENTLY |

FIG. 13D

| NO REGISTRATION TO MANAGEMENT SERVER | VALIDITY FLAG |
|---|---|
| PRIORITIZE | 1 |

FIG. 13E

| NUMBER OF ERROR OCCURRENCES THRESHOLD, VALUE (CASES) |
|---|
| 0(DAYS) |
| 800 |

COMMUNICATION SYSTEM AND METHOD OF CONTROLLING THE SAME

BACKGROUND OF THE INVENTION

Field of the Invention

The present invention relates to a communication system and a method of controlling the same.

Description of the Related Art

As actions for dealing with product troubles become more complicated, customers frequently directly inquire to a call center of a maker to get answers in order to deal with such troubles. Furthermore, execution of a maintenance service by remote operation, and transmitting/receiving of moving images and audio which provides guidance as to how to handle the trouble between an image forming apparatus and a call center in order to swiftly deal with such troubles is being considered (for example, refer to Japanese Patent Laid-Open No. 2005-208974). Generally in such a remote maintenance service, an information processing apparatus of a call center which performs support and an image forming apparatus which is supported are inside respective firewalls. For this reason, installing a relay server that relays communication between both parties on the Internet so that the image forming apparatus and the information processing apparatus can perform communication is proposed (for example, refer to Japanese Patent Laid-Open No. 2013-029922). By installing such a relay server, communication between apparatuses within firewalls becomes possible.

However, when the number of lines connecting such a relay server, image forming apparatuses and information processing apparatuses increases, communication traffic also increases. To deal with this, it is necessary to raise the performance of the relay server or increase the number of relay servers. However, since it is not realistic to increase the number of relay servers endlessly, giving priority to a connection with a relay server, and suppressing the number of relay servers to a predetermined number has been proposed. For example, Japanese Patent Laid-Open No. H06-350723 recites providing a general reserved memory that registers reservation information of a television conference and a priority reserved memory that registers reservation information of a priority reservation, and a control apparatus controlling connections based on general reservations and priority reservations which are registered to each memory. However, according to the above described conventional technique it is assumed that a prioritized terminal for a conference is reserved in advance, and since a priority of a terminal for which a priority reservation has not been made cannot be changed in accordance with the situation, there is a problem in that there is a lack of flexibility.

SUMMARY OF THE INVENTION

The present invention enables realization of a technique that permits a connection of a terminal based on a state of the terminal, by confirming the state of the connecting terminal using a management server which manages the terminal.

One aspect of the present invention provides a communication system including a first terminal, a second terminal, a relay server operable to relay between the first terminal and the second terminal, and a management server operable to manage the first terminal, the relay server comprises: a requesting unit configured to generate a search condition in accordance with a connection request from the first terminal, and to request so that the management server searches for a state of the first terminal; a first transmitting unit configured to, when device information of the first terminal which is transmitted from the management server in response to the request by the requesting unit is obtained, generate relay information and transmit the relay information to the first terminal; and a control unit configured to control communication between the first terminal and the second terminal in accordance with the relay information, and the management server comprises: a notifying unit configured to search for state information of the first terminal in accordance with the search condition requested by the requesting unit, and to communicate the state information to the relay server as the device information; and a second transmitting unit configured to, in accordance with receiving the relay information from the first terminal, transmit the relay information to the second terminal, and wherein the second terminal performs a communication for remote support for the first terminal via the relay server.

Another aspect of the present invention provides a method of controlling a communication system including a first terminal, a second terminal, a relay server operable to relay between the first terminal and the second terminal, and a management server operable to manage the first terminal, the relay server generates a search condition in accordance with a connection request from the first terminal, and requests so that the management server searches for a state of the first terminal; when device information of the first terminal which is transmitted from the management server in response to the request is obtained, generates relay information and transmits the relay information to the first terminal; and controls communication between the first terminal and the second terminal in accordance with the relay information, and the management server searches for state information of the first terminal in accordance with the requested search condition with, and communicates the state information to the relay server as the device information; and in accordance with receiving the relay information from the first terminal, transmits the relay information to the second terminal, and wherein the second terminal performs a communication for remote support for the first terminal via the relay server.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a sequence diagram for explaining an operation of the MFP, the PC, the relay server and the management server according to the first embodiment.

FIGS. 5A and 5B are a flowchart for describing an operation of the MFP according to the first embodiment.

FIG. 13A to FIG. 13E are views for illustrating examples of tables which a relay server according to the first embodiment uses to determine whether or not to connect with an MFP.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

First, an explanation will be given for the present invention of the first embodiment.

Figure 1:
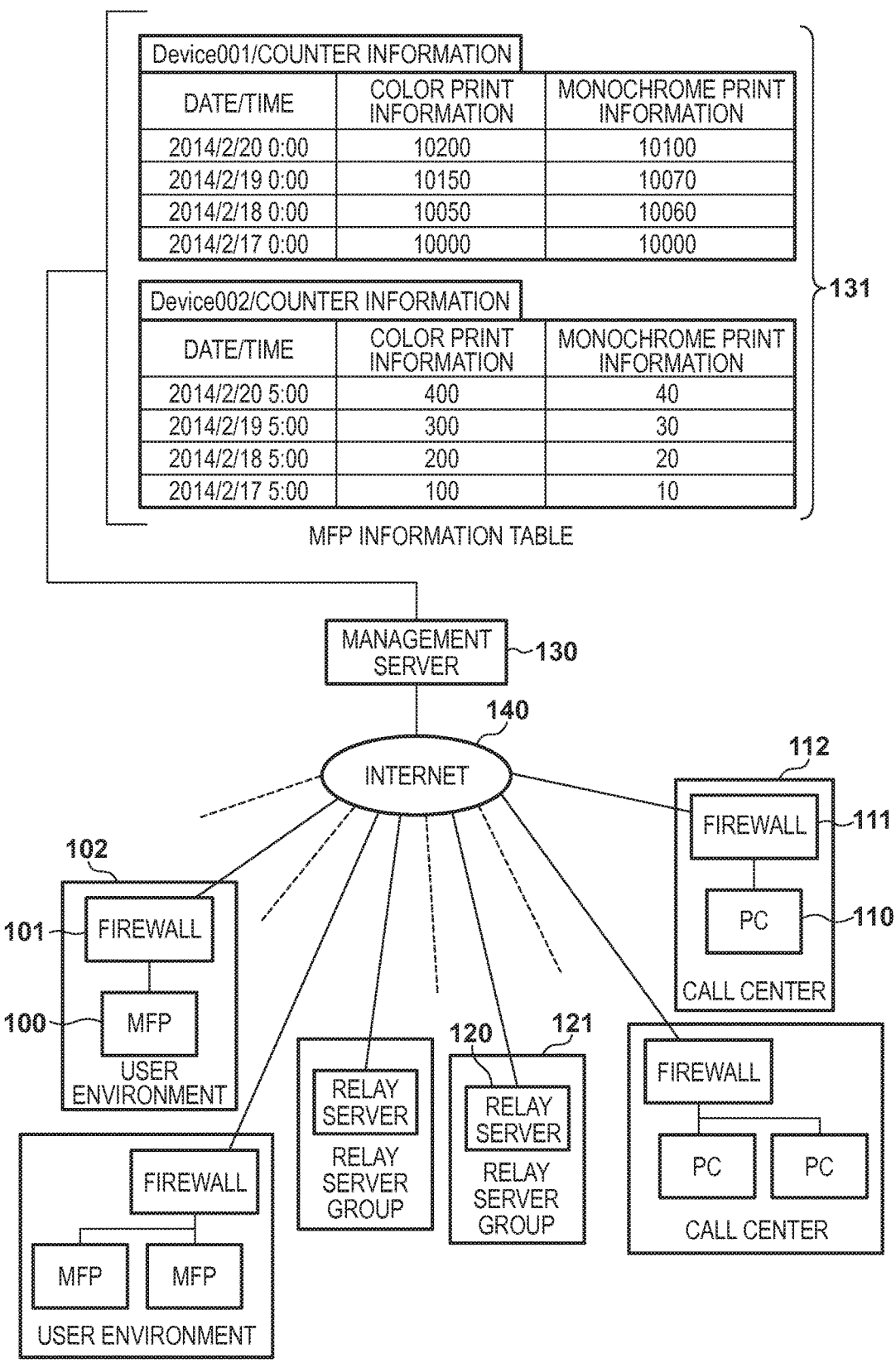
FIG. 1 is a view for illustrating an example of a configuration of a communication system which can provide a remote support service which is secure through a network.

FIG. 1 is a view for illustrating an example of a configuration of a communication system which can provide a remote support service which is secure through a network.

An MFP (Multi Function Peripheral) 100 is arranged in a user environment 102 and operated by a user. A PC 110 is located inside a call center 112 and operated by an operator. There may be multiple instances of the user environment 102 and the call center 112, and furthermore there can be many MFP and PCs. Firewalls 101 and 111 are installed in the user environment 102 and the call center 112. The firewall 101 is configured to permit connection from a terminal which is inside the user environment 102 to the Internet 140, and refuse connection to the terminal inside the user environment 102 from the Internet 140. The firewall 111 is configured to permit connection from a terminal which is inside the call center 112 to the Internet 140, and refuse connection to the terminal inside the call center 112 from the Internet 140.

A relay server group 121 is a relay server group which includes a server computer which provides a relay service through the Internet 140, and there may be one relay server or there may be a plurality of relay servers. Only a relay server 120 is shown for FIG. 1.

The MFP 100 and the PC 110 comprise an HTTP (Hyper Text Transfer Protocol) data communication function. For data communication by HTTP, client nodes perform data communication with each other by repeatedly performing POST and GET with respect to a URL (Uniform Resource Locator) which is provided from an HTTP relay server. In the first embodiment, repeatedly performing POST is referred to as POST polling, and repeatedly performing GET is referred to as GET polling. With this, it is possible for client nodes to perform data communication with each other even when blocked by a private address area and a firewall. In the first embodiment, the MFP 100 and the PC 110 operate as HTTP client nodes. Also, a monitoring module which monitors the MFP itself is embedded in the MFP 100. The monitoring module monitors a status of the MFP 100 and communicates a state of the MFP 100 to a management server 130. The relay server 120 operates as an HTTP relay server.

The management server 130 is installed on the Internet 140, and by performing communication with the monitoring modules within the MFPs that are installed the respective user environment 102, the management server 130 collects MFP information and manages MFPs. Information of the MFP (hereinafter referred to as management information) collected by the management server 130 includes operating information such as a counter value, an operating log, a part counter value which represents a level of consumption of parts used in the MFP, and failure information such as a hardware malfunction, jamming and the like.

The management server 130 stores an MFP information table 131 which associates which call center 112 each MFP 100 is managed by for all of the MFPs 100 that are managed. In FIG. 1, as two MFP information items, counter information for monochrome and color printing of Device001 and Device002 are stored together with date/times. Note that, details of the MFP information table 131 will be explained later with reference to FIG. 9. In accordance with the MFP information table 131, basic usage conditions of the MFP, an emergency contact during an occurrence of a malfunction, or the like can be provided to the appropriate call center 112.

More specifically, when an operator who is a user of the management server 130 logs in to the management server 130, the management information collected from the monitoring target MFP 100 is displayed to a display unit of the management server 130. With this an operator can confirm a state of the MFP 100. Also, highly urgent information such as a service call error or a hardware malfunction can be communicated by transmitting a mail to a notification destination which is registered to the MFP information table 131 that corresponds to the MFP. Also, information concerning the MFP 100 connecting to the relay server 120 is communicated to the operator through the management server 130 immediately as event information by communication between the MFP 100 and the management server 130. In this way the management server 130 manages information of the MFP 100 and the call center 112 which corresponds to the MFP 100.

Note that in the first embodiment the MFP 100 and the PC 110 are configured to communicate through the firewalls 101 and 111 towards the Internet 140, however a network configuration may be taken which does not go through the firewalls 101 and 111. Also, in the first embodiment HTTP does not need to be used as the communication protocol.

Figure 2:
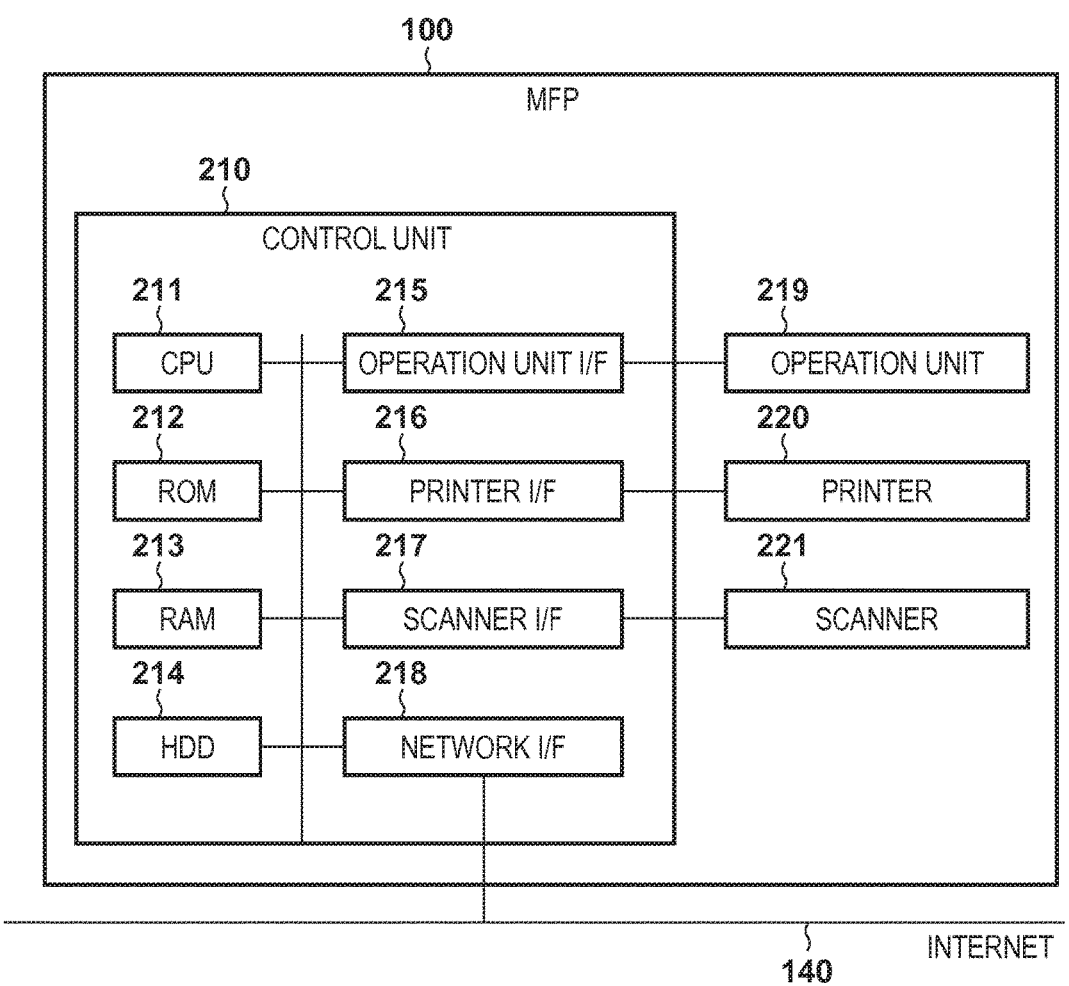
FIG. 2 is a block diagram explaining a hardware configuration of an MFP according to the first embodiment.

FIG. 2 is a block diagram explaining a hardware configuration of the MFP 100 according to the first embodiment.

A control unit 210 which includes a CPU 211 controls overall operation of the MFP 100. The CPU 211 executes a boot program stored in a ROM 212 and loads an OS and programs that are stored in an HDD 214 to a RAM 213, and according to the programs performs various control such as reading control and transmission control. The RAM 213 is used as a temporary storage area such as a main memory or a work area of the CPU 211. Note that in the case of the MFP 100, while one CPU 211 uses a single memory (the RAM 213) to perform each process shown in the later explained flowcharts, other embodiments may be taken. For example, a configuration may be taken cause multiple CPUs and multiple RAMs or HDDs to coordinate, so as to perform processes shown in the flowcharts that will be explained later. The HDD (hard disk drive) 214 stores image data and various programs. An operation unit I/F 215 connects an operation unit 219 and the control unit 210. On the operation unit 219 a keyboard, a display unit that has a touch panel function, or the like are arranged. A printer I/F 216 connects a printer 220 and the control unit 210. Image data to be printed on the printer 220 is transferred to the printer 220 from the control unit 210 through the printer I/F 216, and printed on a storage medium (a sheet) by the printer 220. A scanner I/F 217 connects a scanner 221 and the control unit 210. The scanner 221 reads in an image of an original and generates image data, and inputs into the control unit 210 through the scanner I/F 217. The MFP 100 can transmit image data generated by the scanner 221 through file transmission or mail. A network I/F 218 connects the control unit 210 to a network.

Figure 3:
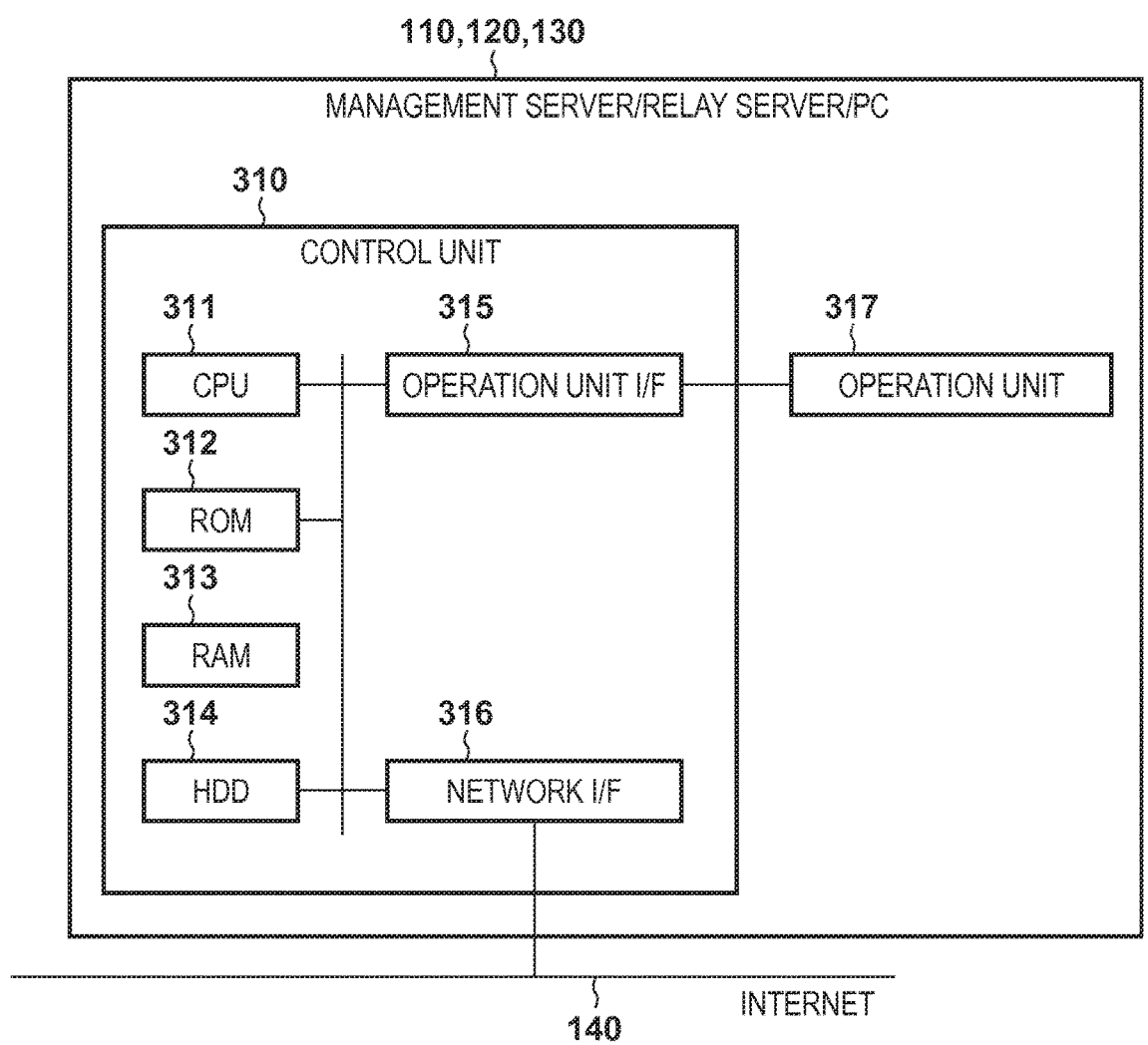
FIG. 3 is a block diagram for explaining a hardware configuration of a PC, a relay server, and a management server according to the first embodiment.

FIG. 3 is a block diagram for explaining a hardware configuration of the PC 110, the relay server 120, and the management server 130 according to the first embodiment.

A control unit 310 which includes a CPU 311 controls overall operation. The CPU 311 executes a boot program stored in a ROM 312, and reads out an OS and programs that are stored in an HDD 314, and performs various control by loading the programs into a RAM 313, and executing them. The RAM 313 is used as a temporary storage area such as a main memory or a work area of the CPU 311. The HDD 314 stores image data and various programs. An operation unit I/F 315 connects an operation unit 317 and the control unit 310. The operation unit 317 is arranged with a keyboard, a pointing device, a display unit that has a touch panel function or the like. A network I/F 316 connects to a network or the Internet 140.

FIG. 4 is a sequence diagram explaining operation of the MFP 100, the PC 110, the relay server 120, and the management server 130 according to the first embodiment. The operation explained in the sequence diagram is realized by the CPU 211 of the MFP 100 loading a control program that is stored in the HDD 214 into the RAM 213 and executing the control program. Also, processing of the PC 110, the relay server 120, and the management server 130 is realized by the CPU 311 of each apparatus loading a control program that is stored in the respective HDD 314 into the RAM 313 and executing it.

The MFP 100 logs in to the relay server 120 in step S401 when a user inputs a support start request through the operation unit 219. Then, in step S402 the MFP 100 requests of the relay server 120 the generation of a support URL. This support URL is relay information that is required for the MFP 100 and the PC 110 to communicate through the relay server 120.

With this, the relay server 120 queries the management server 130 about state information of the MFP 100 in step S403. Then, in step S404 the management server 130 returns to the relay server 120 information in response to the query. Then the relay server 120 determines whether or not to accept the generation request for the support URL based on the return information (device information) from the management server 130 received in step S404. In a case where it is determined that generation of the support URL is not performed, in step S405, error information indicating that the support URL cannot be generated is communicated to the MFP 100. On the other hand, in a case where it is determined that the support URL is to be generated, the support URL is generated in step S406 and the generated support URL is communicated to the MFP 100 in step S407. Here, processing of step S401-step S407 of the relay server 120 will be explained later with reference to figures from FIG. 10.

Next, in step S408 or in step S412, the relay server 120 buffers information of the PC 110 or the MFP 100 in the RAM 313 as a participant when the relay server 120 receives a request to participate to the support URL from the MFP 100 or the PC 110.

Also, in step S409 or in step S415, the relay server 120 returns the update information of the participant that is buffered in the RAM 313 to the MFP 100 or the PC 110 when the relay server 120 receives a GET polling for the participant information towards the support URL from the MFP 100 or the PC 110. Also, in step S418 or in step S419 the relay server 120 deletes the information of the MFP 100 or the PC 110 from the participant information that is buffered in the RAM 313 when the relay server 120 receives a withdraw request towards the support URL from the MFP 100 or the PC 110.

Also, in step S414 and in step S415, the relay server 120 buffers support data in the RAM 313 when the relay server 120 receives a POST polling for support data towards the support URL from the MFP 100 or the PC 110. The support data may be, for example, moving images, audio, or remote operation instruction data.

Also, the relay server 120 returns the support data that is buffered in the RAM 313 to the MFP 100 or the PC 110 when the GET polling is made towards the support URL from the MFP 100 or the PC 110. Multiple support URLs may exist, and in a case when multiple URLs exist, a buffering region of the RAM 313 is allocated for each support URL.

Also, in step S408, the MFP 100 transmits to the relay server 120 a participation request towards the support URL. Next in step S409 the MFP 100 starts a GET polling for participant information towards the support URL. Then in step S410 the MFP 100 transmits the support URL and an MFP identifier to the management server 130. Here the MFP identifier is a globally unique identifier that specifies the MFP 100. As explained later, the management server 130 includes a table which associates the MFP 100 and the call center 112.

In step S411 the management server 130 transmits the URL of the management server 130 and the support URL to the PC 110 upon identifying the notification destination call center 112 from the MFP identifier. In the first embodiment, the protocol used for transmission in step S411 is electronic mail, however configuration may be taken to use something other than electronic mail. For example, a method of obtaining data by performing HTTP GET polling from the PC 110 to the management server 130 in order to get over the firewall 111 may be used.

Here, the management server 130 manages an error history for an MFP as MFP information. Therefore, by connecting to the URL of the management server 130, it is possible to obtain the error history of the MFP 100. With this an operator is able to reference a past error occurrence situation of the MFP when supporting the MFP 100. In the first embodiment an error history is treated as an example of MFP information, however, this may be other information such as part replacement information, counter information.

Also, in step S412, the PC 110 transmits to the relay server 120 a request to participate to the support URL. With this the relay server 120 transmits the participant information to the MFP 100 in step S413.

In this way, the MFP 100 and the PC 110 start POST polling and GET polling for support data towards the support URL in step S414 and in step S415. Then in step S416 the PC 110 transmits a request to obtain MFP information towards the URL of the management server 130. With this the management server 130, in step S417, transmits the MFP information of the MFP 100 to the PC 110. In this way the MFP 100 and the PC 110 perform communication of support data through the relay server 120. For example, when a malfunction such as a jam error or the like occurs at the MFP 100, and a user cannot recover from the malfunction, failure information is communicated to the operator of the call center 112 from the MFP 100 in order to help find the cause of the malfunction. In such a case, the relay server 120 stores this information in the RAM 313 when the MFP 100 POSTs the information indicating the malfunction to the support URL. After this, when the PC 110 of the call center 112 transmits a GET request towards the support URL, the relay server 120 transmits the information stored in the RAM 313 as a response to the PC 110. Continuing on, an operator of the call center 112 who understands the cause of the malfunction based on the information transmitted from the MFP 100 conveys a method for cancelling the error to the user of the MFP 100 by a moving image. In such a case, by the operator of the call center 112 operating the PC 110, when a POST request for the moving image data is transmitted towards the support URL, the relay server 120 stores the moving image data in the RAM 313. Afterwards when the MFP 100 transmits a GET request for the support URL, the moving image data which is stored in the RAM 313 of the relay server 120 is transmitted to the MFP 100 and displayed to the operation unit 219.

In such a way, when support by the operator ends, in step S418 and in step S419 the MFP 100 and the PC 110 transmit withdraw requests towards the support URL. With this, in step S420, the relay server 120 discards the unnecessary support URL and ends this process.

FIGS. 5A and 5B are a flowchart for describing an operation of the MFP 100 according to the first embodiment. Each operation (step) shown in this flowchart is realized by the CPU 211 of the MFP 100 executing a control program that was loaded into the RAM 213. Note that in the explanation hereinafter, steps in FIG. 4 which correspond to steps in FIGS. 5A and 5B are shown in parentheses.

Firstly, in step S501 the processing proceeds to step S502 when the CPU 211 detects that an error has occurred in the MFP 100, and the CPU 211 transmits the error to the management server 130. Note that a configuration may be taken such that the MFP 100 divides errors into levels based on a degree of importance and a level of emergency of the error, and transmits only errors having a high level to the management server 130. Next, the processing proceeds to step S503 and the CPU 211 waits for the user to input a support start request through the operation unit 219, and when the support start request is input, the processing proceeds to step S504 and the CPU 211 logs in to the relay server 120 (step S401). Then in step S505 the CPU 211 determines whether or not the CPU 211 can log in without a problem to the relay server 120, and when login succeeds the processing proceeds to step S506, and otherwise the processing proceeds to step S516. In step S506 the CPU 211 transmits a support URL generation request to the relay server 120 (step S402). Then the processing proceeds to step S507 and the CPU 211 receives the support URL from the relay server 120 (step S407). Next, the processing proceeds to step S508 and the CPU 211 transmits a participation request to the support URL (step S408), and in step S509 the CPU 211 starts a GET polling for participant information towards the support URL (step S409).

Next, the processing proceeds to step S510 and the CPU 211, transmits an MFP identifier and the support URL to the management server 130 (step S410). Then the processing proceeds to step S511 and the CPU 211 determines if transmission to the management server 130 has succeeded, and in a case when the CPU 211 determines that transmission towards the management server 130 has succeeded the processing proceeds to step S512; otherwise the processing proceeds to step S520. In step S512 the CPU 211 receives the participant information from the relay server 120 (step S413). With this, the MFP 100 itself can specify the PC 110 which performs support. Next, the processing proceeds to step S513 and the CPU 211 starts POST polling and GET polling for the support data towards the support URL (step S414). The support data may be, for example, moving images, audio, or remote operation instruction data. More specifically, as described above, by transmitting the POST request and the GET request of the support data towards the support URL, the support data that is transmitted from the PC 110 is received, the support data is transmitted to the PC 110. With this, a user of the MFP 100, is capable of receiving support by audio or moving image communication and by remote operation from an operator of the PC 110.

In this way, when the support ends the processing proceeds to step S514, and the CPU 211 waits for the user to input a support stop request input through the operation unit 219. In step S514 the CPU 211 receives the input of the support stop request from the operation unit 219, the processing proceeds to step S515, the CPU 211 transmits a withdraw request to the support URL (step S418), and the processing ends.

On the other hand, when the CPU 211 fails to login to the relay server 120 in step S505, the processing proceeds to step S516, and the CPU 211 transmits a failure to connect to the relay server 120 towards the management server 130. Next the processing proceeds to step S517 and the CPU 211 determines if transmission to the management server 130 succeeded. Here if the CPU 211 determines that transmission towards the management server 130 has succeeded, the processing proceeds to step S518, the CPU 211 displays to the operation unit 219 that the call center 112 is notified, and this processing ends. On the other hand, in step S517 when the CPU 211 determines that transmission to the management server 130 has failed the processing proceeds to step S519. In step S519 the CPU 211 displays a telephone number of the call center 112, and a message prompting the user to contact the call center 112 (for example "Please call the call center" or the like) to the operation unit 219, and ends this process.

Also, in a case when the CPU 211, in step S511, determines that transmission to the management server 130 has failed, the processing proceeds to step S520 and the CPU 211 displays to the operation unit 219 the support URL, a call center telephone number, and a message prompting the user to contact the call center 112, and ends this process.

Figure 6:
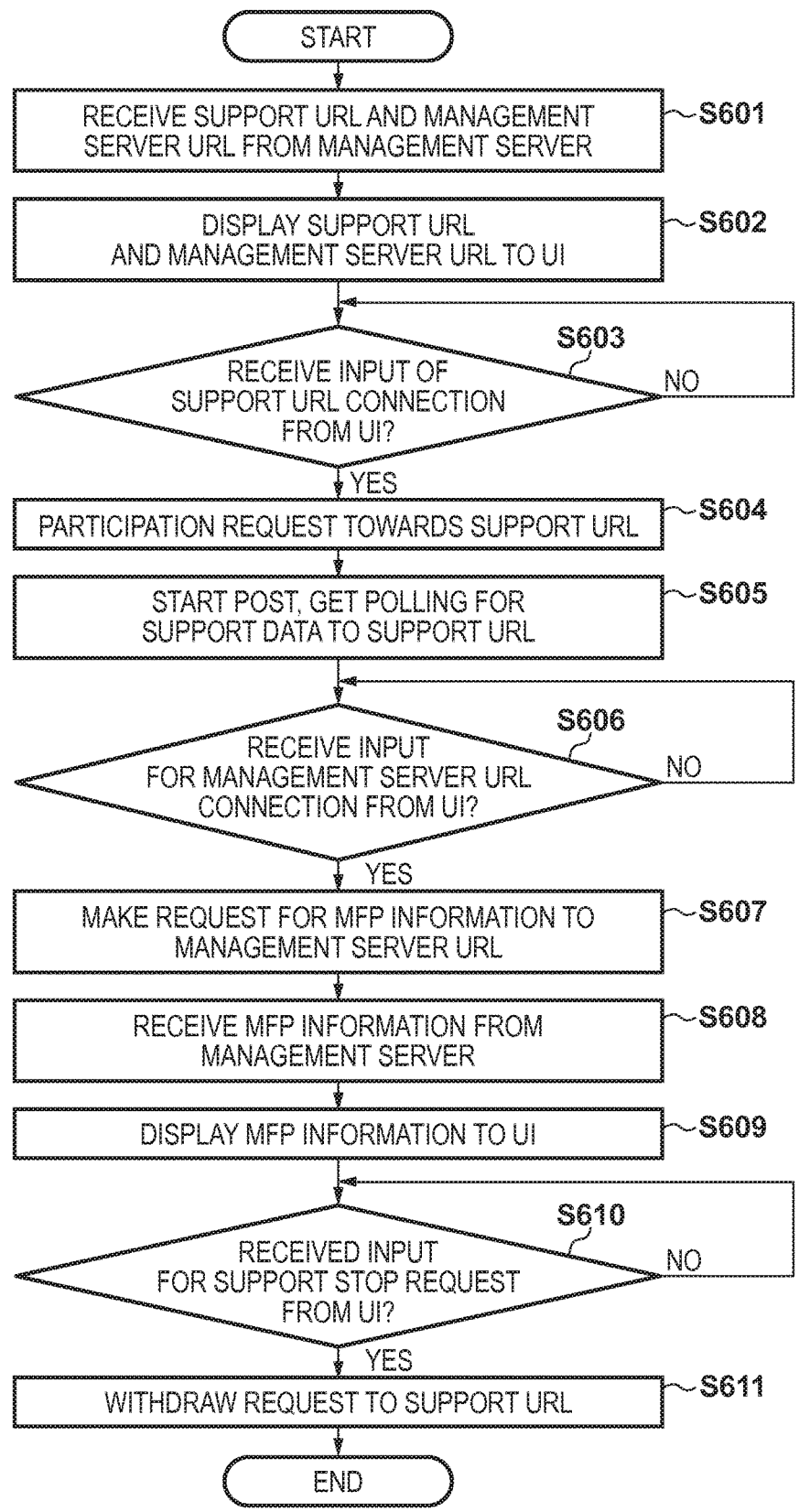
FIG. 6 is a flowchart for describing an operation of the PC according to the first embodiment.

FIG. 6 is a flowchart for describing an operation of the PC 110 according to the first embodiment. Each operation (step) shown in this flowchart is realized by the CPU 311 of the PC 110 executing a control program that was loaded into the RAM 313. Note that in the explanation hereinafter, steps in FIG. 4 which correspond to steps in FIG. 6 are shown in parentheses.

Firstly, in step S601 the CPU 311 of the PC 110 (hereinafter referred to as the CPU 311) receives a support URL and a URL of a management server from the management server 130 (step S411). Next, the processing proceeds to step S602, the CPU 311 displays the support URL and the URL of the management server to the operation unit 317. Received electronic mail information may be displayed as is to the operation unit 317 or it may be displayed to a screen of an application. Next, the processing proceeds to step S603 and the CPU 311 waits to receive an input instruction for connecting to the support URL from the operation unit 317; when the CPU 311 receives the instruction to connect to the support URL the processing proceeds to step S604 and the CPU 311 transmits a participation request to the support URL (step S412).

Next the processing proceeds to step S605 and the CPU 311 starts transmitting/receiving the support data through the relay server 120. Here POST and GET polling for the support data towards the support URL is started (step S415). With this the operator of the PC 110 is enabled to perform support by audio and moving image communication as well as remote operation for the user of the MFP 100.

Next, in step S606 the CPU 311 waits for inputting of an instruction to connect to the URL of the management server 130 from the operation unit 317, and when the instruction to connect to the URL of the management server 130 is received, the processing proceeds to step S607. In step S607, the CPU 311 makes a request for MFP information to the URL of the management server 130 (step S416). Next, the processing proceeds to step S608 and when the CPU 311 receives the MFP information from the management server 130 (step S417), the processing proceeds to step S609 and the CPU 311 displays the received MFP information to the operation unit 317. With this the operator of the PC 110 is able to reference a past error occurrence situation of the MFP 100 when performing support. In this way, when the support ends, in step S610 the CPU 311 waits for the operator to input a support stop request through the operation unit 317, and when the operator inputs the support stop request through the operation unit 317 the processing proceeds to step S611. In step S611 the CPU 311 transmits a withdraw request to the support URL (step S419) and the processing ends.

In this way, when an error occurs in the MFP 100, the user of the MFP 100 connects to the operator of the PC 110 through the relay server 120 and the operator of the PC 110 can perform support by audio and moving image communication as well as remote operation for the user of the MFP 100.

Figure 7:
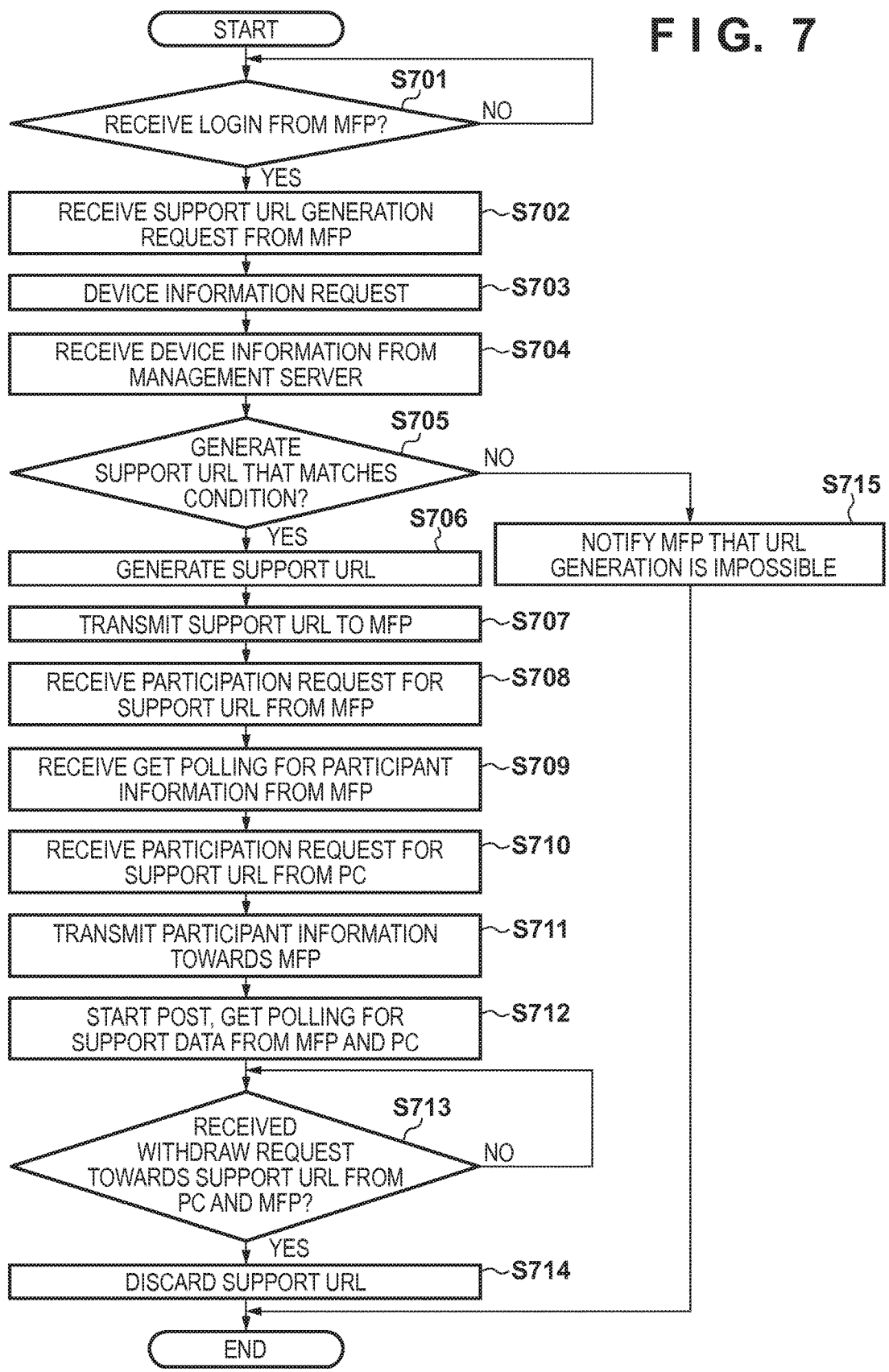
FIG. 7 is a flowchart for describing an operation of the relay server according to the first embodiment.

FIG. 7 is a flowchart for describing an operation of the relay server 120 according to the first embodiment. Each operation (step) shown in this flowchart is realized by the CPU 311 of the relay server 120 executing a control program that was loaded into the RAM 313. Note that in the explanation hereinafter, steps in FIG. 4 which correspond to steps in FIG. 7 are shown in parentheses.

Firstly, in step S701 the CPU 311 of the relay server 120 (hereinafter referred to as the CPU 311) waits to receive a login from the MFP 100 (step S401). In step S701, when the CPU 311 receives a login from the MFP 100 the processing proceeds to step S702 and the CPU 311 receives a generation request for a support URL from the MFP 100 (step S402). Next the processing proceeds to step S703 and the CPU 311 requests state information of the MFP 100 from the management server 130 to determine whether or not to generate a support URL (step S403). Here, the requested information is not limited to state information that is limited to one MFP 100, and can also be state information for multiple MFPs 100 of the same customer. An example of a request other than one for state information of one MFP 100 will be explained later.

Next, the processing proceeds to step S704 and the CPU 311 responds to the request and receives the state information of the MFP 100 transmitted from the management server 130 (step S404). Then the processing proceeds to step S705 and the CPU 311 determines whether or not to generate a support URL based on the received state information of the MFP 100 and a condition stored in advance in the HDD 314. Here, in a case where it is determined to not generate a support URL the processing proceeds to step S715 and the CPU 311 notifies that generation of a support URL for the MFP 100 is not possible (step S405) and the processing ends. Note that this notification may be either an error message or an error code.

On the other hand, in step S705 when the CPU 311 determines to generate a support URL, the processing proceeds to step S706 and the CPU 311 generates a support URL (step S406). Then the processing proceeds to step S707 and the CPU 311 transmits the generated support URL to the MFP 100 (step S407). Next the processing proceeds to step S708 and the CPU 311 receives a request to participate for the support URL from the MFP 100 (step S408), and next, in step S709 the CPU 311 receives GET polling for participant information from the MFP 100 (step S409). Then in step S710 the CPU 311 receives a participation request for the support URL (step S412) from the PC 110, the processing proceeds to step S711, and the CPU 311 transmits the participant information to the MFP 100 (step S413). In this way in step S712 when the CPU 311 receives the POST polling for the support data from the MFP 100 and the PC 110, the support data is stored in the RAM 313. Also, when the GET request for the support data is received from the MFP 100 or the PC 110, the support data that was stored in the RAM 313 is transmitted to the request source. With this, the support data is transmitted/received between the MFP 100 and the PC 110, and on top of this, the operator of the PC 110 is able to perform support for the user of the MFP 100 (step S414, step S415).

In this way, when support ends in step S713 the CPU 311 waits to receive the withdraw request towards the support URL from the MFP 100 and the PC 110 (step S418, step S419). In this way in step S713 when the CPU 311 receives the withdraw requests towards the support URL the processing proceeds to step S714, and the CPU 311 discards the support URL (step S420), and the processing ends.

With this the operator of the PC 110 can perform support by audio and moving image communication as well as remote operation for the user of the MFP 100.

Figure 8:
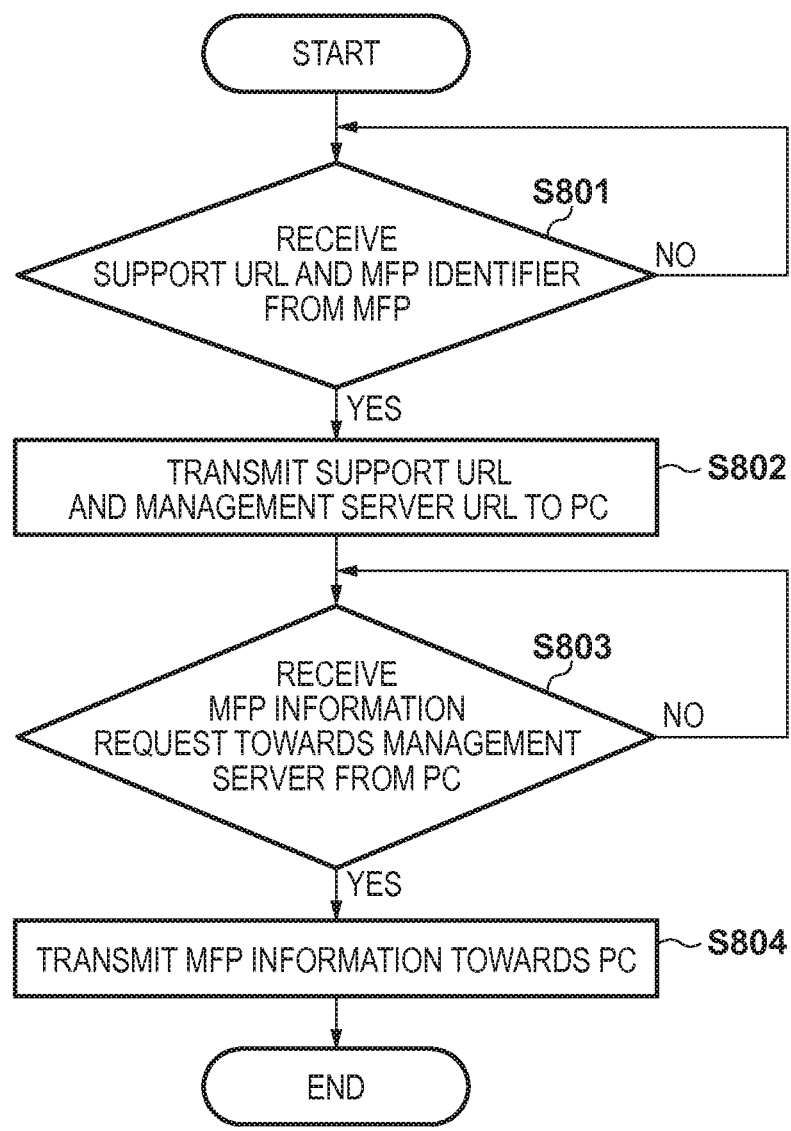
FIG. 8 is a flowchart for describing an operation of the management server according to the first embodiment.

FIG. 8 is a flowchart for describing an operation of the management server 130 according to the first embodiment. Each operation (step) shown in this flowchart is realized by the CPU 311 of the management server 130 executing a control program that was loaded into the RAM 313. Note that in the explanation hereinafter, steps in FIG. 4 which correspond to steps in FIG. 8 are shown in parentheses.

Firstly, in step S801 the CPU 311 of the management server 130 (hereinafter referred to as the CPU 311) waits to receive the MFP identifier and the support URL from the MFP 100 (step S410). When the MFP identifier and the support URL are received the processing proceeds to step S802 and, based on the MFP information table 131, the CPU 311 identifies the PC 110 of the call center 112 which corresponds the MFP 100, and transmits the support URL and the URL of the management server 130 to the PC 110

(step S411). Next the processing proceeds to step S803 and the CPU 311 waits for a MFP information request to be transmitted from the PC 110 towards the URL of the management server 130 (step S416). When the MFP information request is received, the processing proceeds to step S804 and the CPU 311 transmits the device information of the requested MFP 100 to the PC 110 (step S417), and the processing ends.

In this way the management server 130 can notify the PC 110 of information of the MFP 100 which is supported by the PC 110.

Figure 9:
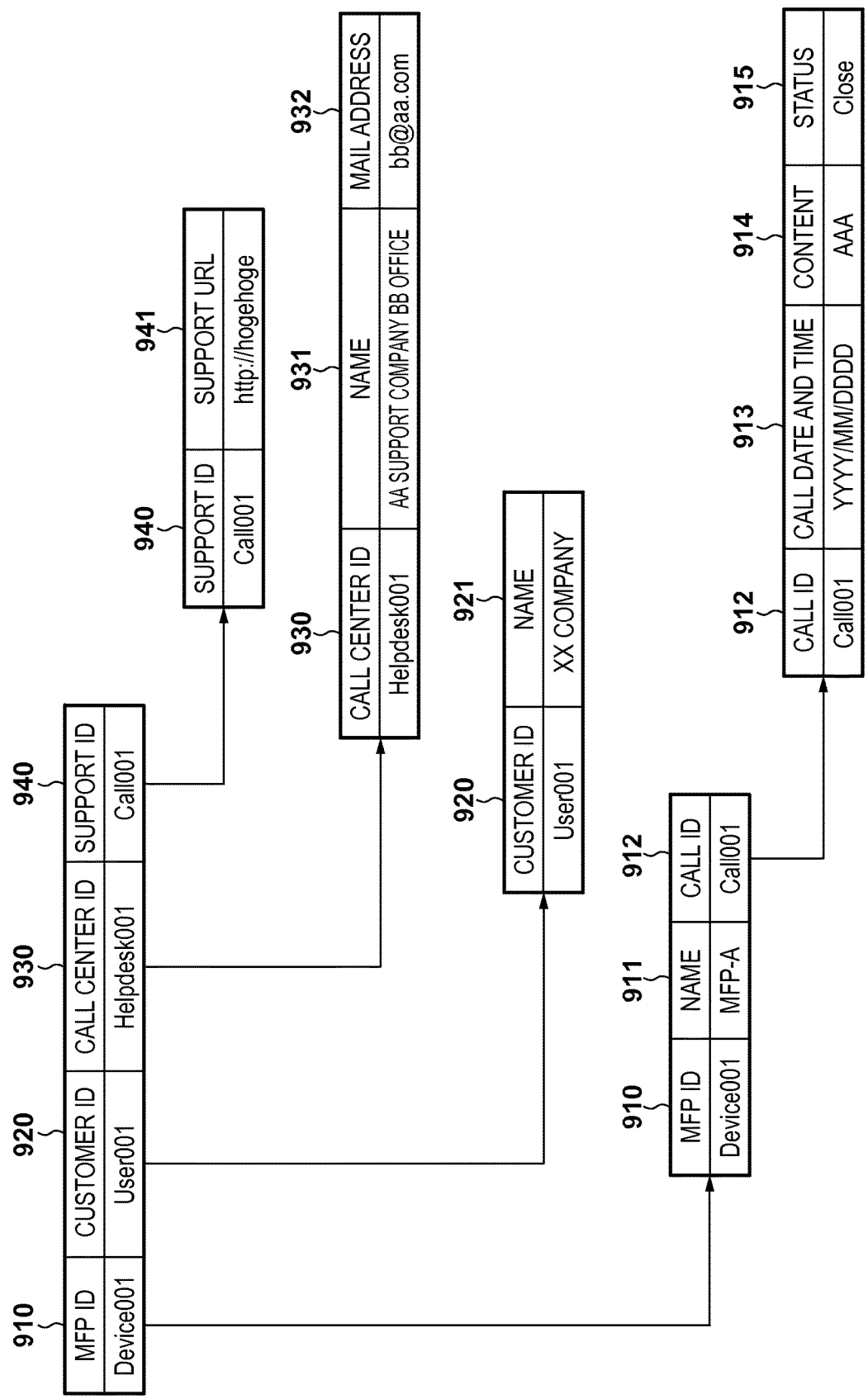
FIG. 9 is a view for explaining an example of MFP information which is stored in an HDD of the management server according to the first embodiment.

FIG. 9 is a view for explaining an example of MFP information which is stored in the HDD 314 of the management server 130 according to the first embodiment.

The MFP information is stored in the MFP information table 131, and the MFP information table 131 includes an MFP ID 910, a user (customer) ID 920, a call center ID 930, and a support ID 940. The MFP ID 910 is identification information for uniquely identifying each MFP, and corresponds to an MFP identifier which is transmitted from the MFP 100 to the management server 130 in step S410 of FIG. 4. In FIG. 9 "Device001" is registered to the MFP ID 910. Information 911 is information showing a product name (here it is "MFP-A") of the MFP 100. Information 912 is information for identifying past communications of the MFP 100, and there can be multiple information 912 items according to the number of communications. FIG. 9 includes a single information 912 item which is "Call01". Information 913 is information showing a date/time of a call. Information 914 is information showing content of a call. Information 915 is information showing a status of a call. The information 912-915 corresponds to the MFP information transmitted to the PC 110 from the management server 130 in step S417 of FIG. 4.

The user ID 920 is information for identifying a customer of the MFP 100, which here is "User001". A user name 921 is information showing a name of a customer.

The call center ID 930 is identification information (call center ID) for identifying the call center 112 of the MFP 100. A name 931 shows a name of a call center, a mail address 932 is information that shows a mail address of the call center 112, and the mail address 932 is information which can be used as a transmission destination for an electronic mail in step S411 of FIG. 4.

The support ID 940 is information for identifying the support work (a support ID). In step S410 of FIG. 4 the support ID 940 is updated at a timing when the MFP identifier and the support URL are transmitted to the management server 130 from the MFP 100. A support URL 941 corresponds to the support URL which is transmitted in step S407 and in step S411 of FIG. 4.

In this way, the management server 130 manage by associating the MFP 100 with the user using the MFP 100, as well as the call center 112 that performs maintenance operations for the MFP. Accordingly, if the MFP 100 is under management of the management server 130, even in a case when a support start operation has been performed for the MFP 100, the necessary information (support URL and the like) for support can be communicated to the appropriate call center.

As explained above, by the first embodiment the MFP 100 communicates the support URL that is allocated from the relay server 120 to the management server 130 and the management server 130 communicates the URL to the PC 110 of the appropriate call center 112. With this, communication between the PC 110 and the MFP 100 through the relay server 120 becomes possible simply by the user of the MFP 100 performing an instruction for starting support, and the user of the MFP100 is enabled to receive support remotely from the operator of the PC 110.

Figure 10:
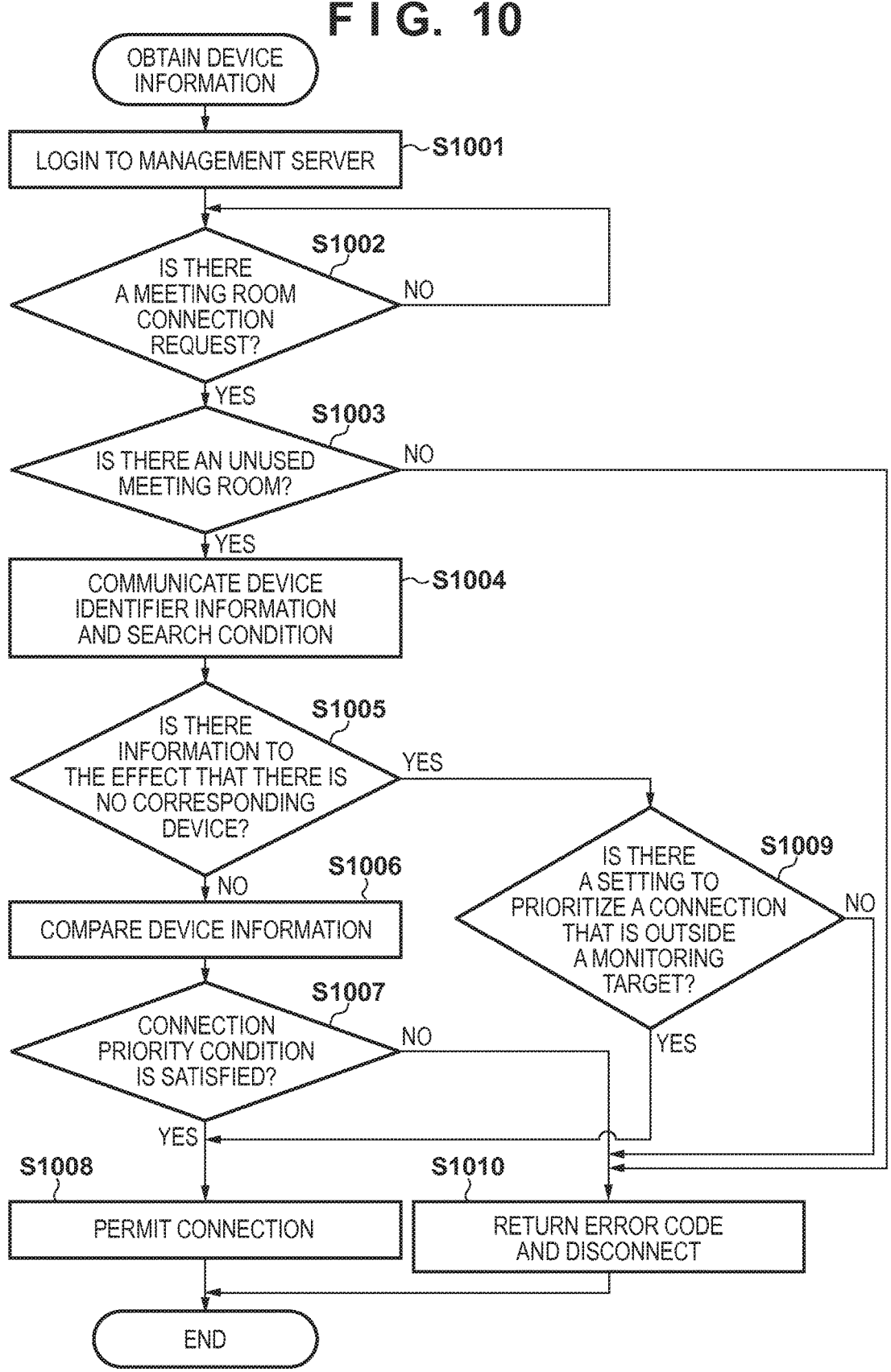
FIG. 10 is a flowchart for describing a procedure of a relay server obtaining condition information of a device from the management server according to a login from the MFP and controlling a connection with the MFP according to the first embodiment.

FIG. 10 is a flowchart for describing a procedure for the relay server 120 according to the first embodiment obtaining device state information from the management server 130 according to a login from the MFP 100 and controlling connection with the MFP 100.

An explanation will be given for an operation with this assumption with reference to FIG. 4. After the MFP 100 logs in in step S401 of FIG. 4, in step S402 the MFP 100 makes a request for allocation of an open meeting room to the relay server 120. At this time the relay server 120, according to a condition of its own resources that can be used for support, requests device information from the management server 130 (step S403), and queries a state of the device of the MFP 100 which logged in. Since the MFP 100 successively receives state information from the MFP 100, the management server 130 can provide information of the device in step S404, for a request for the device information from the relay server 120. With this the relay server 120 notifies the MFP 100 as to whether or not connection is possible with the MFP 100 according to the information of the device that is received (step S407). Alternatively, when there is no open meeting room, an error code to the effect that a meeting room cannot be provided is communicated to the MFP 100 (step S405). With this the relay server 120 can control whether or not to permit or reject a connection according to the state of the MFP 100 that makes a request. Note that, in FIG. 4 after the connection to the MFP 100, a device information request is performed towards the management server 130; however, a device information request may also be performed upon login processing of step S401.

Next, an explanation of processing of the relay server 120 according to the first embodiment will be given with reference to a flowchart of FIG. 10. Note that each operation (step) shown in this flowchart is realized by the CPU 311 of the relay server 120 executing a control program that was loaded into the RAM 313. Here, in response to a query from the MFP 100 as to whether or not a meeting room is open, it is determined whether or not to connect the MFP with the relay server 120 based on device information of the MFP that is managed by the management server 130.

Firstly, in step S1001, the CPU 311 of the relay server 120 (hereinafter referred to as the CPU 311) logs in to the management server 130. Here, as an approach for performing a login, the login may use an ID and a password, or a negotiation by protocol may be performed. Also, configuration may be taken such that since information of the management server 130 is mutually understood, a connection restriction is performed by a router or the like, and a persistent connection is performed without an ID or a password. Next, the processing proceeds to step S1002 and the CPU 311 waits for a connection request from the MFP 100. As explained in FIG. 4, step S1002 may be either a process for when a login request is made from the MFP 100, or when generating a URL for support use.

When there is a connection request from the MFP 100 the processing proceeds to step S1003, and the CPU 311 checks whether there is a resource for performing support (here this is an open meeting room). A resource checking approach can be storing a maximum number of URLs that can be issued for support use in the HDD 314, or it may be determined that there is a shortage in resources based on a usage pattern during support. For example, a determination of a resource usage condition may be performed based on a condition such as that most communication is of audio and remote operation, and moving images is not used often, or the like.

FIG. 13 is a view for illustrating an example of tables used to determine whether or not the relay server 120 according to the first embodiment connects with the MFP 100.

In FIG. 13A the remaining number of resources (number of unused meeting rooms) that can be connected to is held as a threshold, and in a case when the current value falls below this value it is determined that a URL for support use cannot be generated. In such a case the processing proceeds to step S1010 from step S1003, and the CPU 311 returns the error code to the MFP 100, disconnects the connection, and ends the processing.

When the number of resources (number of open meeting rooms) is larger than zero, and in a case when it exceeds the threshold, it is determined that there is a space in a resource, and generation of a new URL for support use is possible, and the processing proceeds to step S1004. In step S1004 the CPU 311 communicates the search condition and identification information of the MFP 100 to the management server 130. A serial number is uniquely issued for use as the identification information of the MFP 100. Also the search condition designates whether to obtain information of a state of the MFP 100 alone from the management server 130, or to obtain state information of all MFPs that are installed for the customer managing the MFP 100. Also, a search condition may be changed dynamically to match according to a condition of the resources of the relay server 120, such as whether an error is generated, or if there is state information including a warning. Note that in a case when there are zero resources, it is determined that remote support cannot be performed in step S1010, an error code is returned to the MFP 100, and communication is disconnected.

FIG. 13B is a view for illustrating an example of a search condition.

An example is given of designation of "device units" which requests of the management server 130 MFP information of the MFP 100 that requested generation of the support URL only, and "group units" and "sales company units" request MFP information including that of MFPs 100 within the same environment. In FIG. 13B a validity flag for searching in "device units" is set to ON ("1").

The management server 130 executes a search according to the received search condition and device identification information, and if the MFP 100 is outside a monitoring target of the management server 130, and the management server 130 notifies the relay server 120 that none of the MFPs 100 match the condition. With this the CPU 311 in step S1005 determines whether or not it is a target device, according to information of whether or not the MFP 100, that the management server 130 included in the communicated information requested, is a management target. Here when it is determined that it is a management target device, the processing proceeds to step S1006, and device state information comparison processing is executed.

FIG. 13C is a view for explaining a priority target information number that is designated by a priority connection condition, and an occurrence code.

In the device information comparison processing of step S1006, search and comparison processing is performed for all priority target information numbers of FIG. 13C. In a case when, in step S1007, the device information matches even one occurrence code, the CPU 311 determines that a connection priority condition is satisfied, moves the processing to step S1008, executes connection permission processing, permits connection with the MFP 100, and ends connection control processing. On the other hand, when it is determined that the connection priority condition is not satisfied, the processing proceeds to step S1010, the CPU 311 returns an error code to the MFP 100, disconnects communication, and ends this processing. Meanwhile, when the CPU 311 in step S1005 determines that the MFP 100 is not a management target of the management server 130, the processing proceeds to step S1009, and the CPU 311 confirms determination information for a case when the MFP 100 is not managed by the management server 130.

FIG. 13D is a view for illustrating an example of determination information according to the first embodiment.

In FIG. 13D, a validity flag which prioritizes a connection in a case when the MFP 100 is not registered to the management server 130 is set to "1". Therefore, in such a case, the processing proceeds to connection permission processing of step S1008 such that connection with the MFP 100 is permitted. In a case when the MFP 100 is not managed by the management server 130 and the state of the MFP 100 cannot be known, the validity flag is set to "1". With this, even when the state of the MFP 100 is unclear, a connection request can be prioritized. Conversely, it is possible to set such that remote support is not accepted when the MFP 100 is outside a management target of the management server 130 if the validity flag is set to "0". In such a case, the processing proceeds to step S1010 from step S1009, an error code is returned to the MFP 100, the communication is disconnected, and this processing is ended.

Also in step S1007, in a case when none of the priority target information numbers designated in the priority connection condition of FIG. 13C match, it is determined that the MFP 100 does not satisfy the condition to connect with priority. At this time, in step S1010 an error code is returned to the MFP 100, communication is disconnected, and this processing ends. In FIG. 13C, an error code for which the MFP 100 cease to be usable, and an occurrence code such one for a paper jam (jam) frequently occurring will be stored; however warning information that warns of an image defect may also be stored if it can be indicated by a code.

In this way, by virtue of the relay server 120 according to the first embodiment, it is possible to determine whether or not connection with the MFP is permitted by referencing information of an MFP managed by the management server for a connection request from the MFP.

Figure 11:
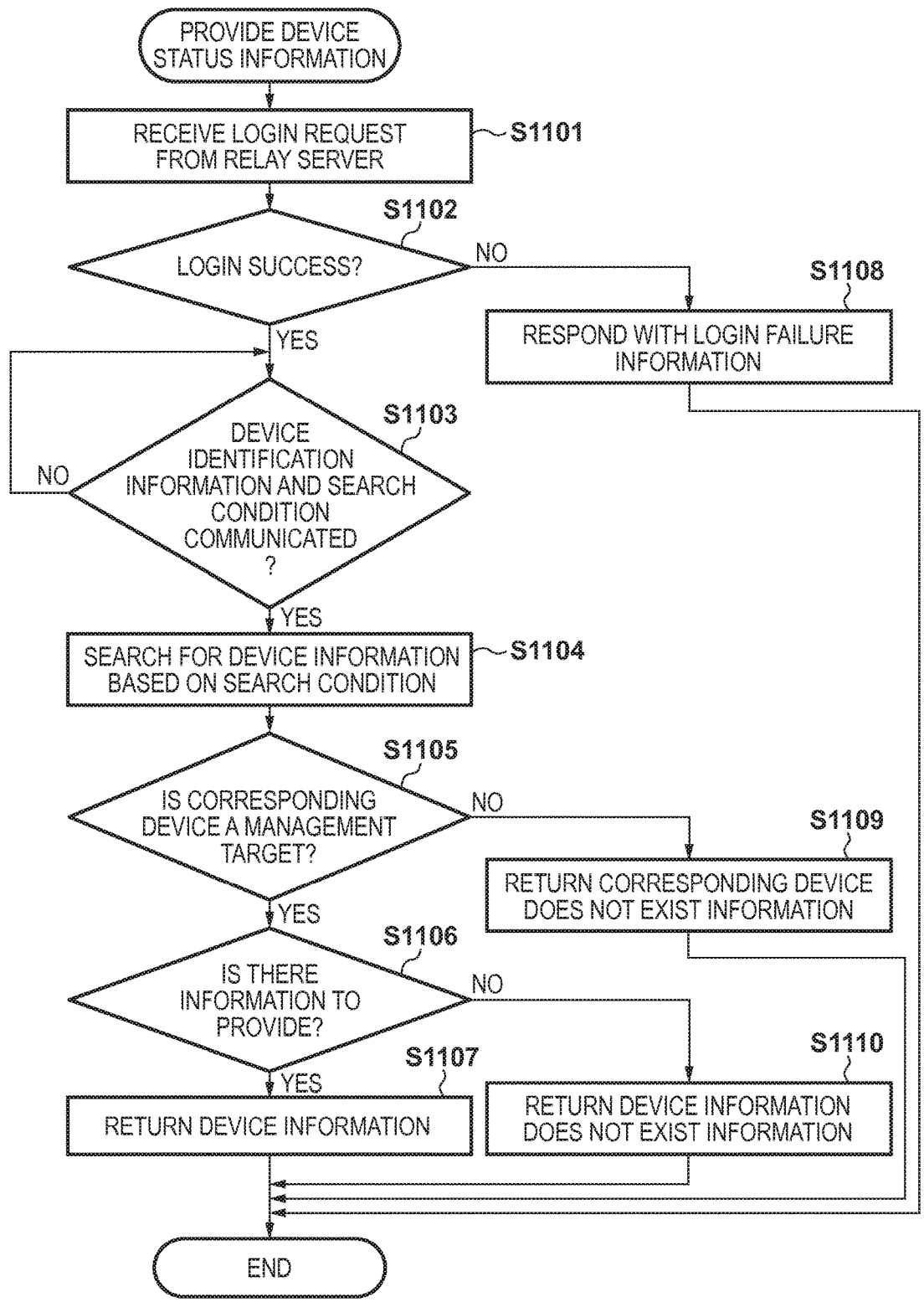
FIG. 11 is a flowchart for describing processing of the management server according to the first embodiment.

FIG. 11 is a flowchart for describing processing of the management server 130 according to the first embodiment. This processing shows a process which is complementary to the process of the relay server 120 shown in the flowchart of FIG. 10. Note that each operation (step) shown in this flowchart is realized by the CPU 311 of the management server 130 executing a control program that was loaded into the RAM 313.

Firstly when, in step S1101, the CPU 311 of the management server 130 (hereinafter referred to as the CPU 311) receives a login request from the relay server 120, the processing proceeds to step S1102. In step S1102 the CPU 311 determines, according to predetermined rules whether or not the login request from the relay server 120 has succeeded. In a case when the relay server 120 is unregistered, and in a case when login cannot be permitted due to expiration of a password, the processing proceeds to step S1108, the CPU 311 returns the information which indicates that it is a login failure to the relay server 120, and this processing ends.

When, in step S1102, the CPU 311 determines that login by the relay server 120 has succeeded, the processing proceeds to step S1103, the CPU 311 waits for the relay server 120 to communicate the identification information and the search condition of the MFP 100. When the identification information and the search condition of the MFP 100 are communicated the processing proceeds to step S1104 and the CPU 311 performs a search of a history of information of the MFP 100 stored in the HDD 314, according to the identification information and search condition of the MFP 100 which were communicated. First, a search as to whether or not the MFP 100 is registered to the management server 130 is performed. In a case when the identification information of the MFP 100 is not registered to the HDD 314, since the MFP 100 is not a management target, a history of information of the MFP does not exist. In such a case the processing proceeds to step S1009 and the CPU 311 returns an error to the relay server 120 to the effect that information of the target MFP 100 cannot be returned and that the MFP 100 that is the search target is not a management target, and the processing ends. This information can be received by the relay server 120 in step S1005 of the previously described FIG. 10.

When in step S1105 the CPU 311 determines that the MFP 100 is registered, the processing proceeds to step S1106, and the CPU 311 searches the history data of the HDD 314 according to the search condition. In a case when information which matches the search condition is not found, the processing proceeds to step S1110 and the CPU 311 returns a response to the relay server 120 to the effect that there is no information, and processing ends. In step S1106 when the CPU 311 determines that information that matches the search condition exists, the processing proceeds to step S1107, the CPU 311 returns the information to the relay server 120 and processing ends. Here, problems that can be considered when a user uses the MFP 100, such as "an error has occurred" and "jams have frequently occurred over a period starting a predetermined interval in the past and spanning until the current time" are concrete examples of information that may be searched. Also information that the management server 130 returns to the relay server 120 can be obtained as corresponding information by the relay server 120 designating "an error", "a frequent occurrence of a jam" and the like as a search condition.

As explained above, by the first embodiment the relay server 120 can control priority for supporting the MFP based on a state of the MFP 100.

Second Embodiment

Next, explanation will be given for a second embodiment of the present invention. In the second embodiment, an example will be explained wherein, by changing a search condition, a connection request from the MFP 100 in which an abnormality does not occur is prioritized. Note that since the configurations of the MFP 100, the PC 110, the relay server 120, and the management server 130 according to the second embodiment are the same as in previously described in the first embodiment, an explanation of these will be omitted.

As previously explained with reference to FIG. 9, the MFP 100 is managed with the MFP ID 910 by the management server 130. Also the MFP 100 is associated with the name 921 of a customer and the customer ID 920. Here, two or more of the MFP 100 can be registered to a single customer, and another MFP that is managed for the same customer can be searched from a particular MFP 100. Using this, the relay server 120 requests to search for state information of another MFP of the same customer as a search condition, when making a request for information of the MFP 100 for device information, the search condition or the like to the management server 130. With this, in a case when a user cannot use the MFP 100 that the user wants to inquire about because it is in an abnormal state, it is possible to similarly handle the inquiry with an inquiry from another normal MFP of the same customer that is within the same environment. At this time, the scope to be searched is specified by setting a validity flag of group units or sales office units to "1", rather than MFP units as previously explained in FIG. 13B. In this way by searching for state information using a search condition that is not for MFP units, it is possible handle the situation by a normal MFP requesting remote support in place of the MFP for which an abnormality is occurring. Also, by dividing the customer information, for example by grouping by administrators of the MFPs in a case when there are many MFP units owned by the same customer, the number of MFP units that are retrieval targets can be suppressed. With this, for example, in a case when a second MFP is in a completely different installation location to a first MFP for which an abnormality is occurring, it can be treated as not being the target of a remote support request from the first MFP.

Figure 12:
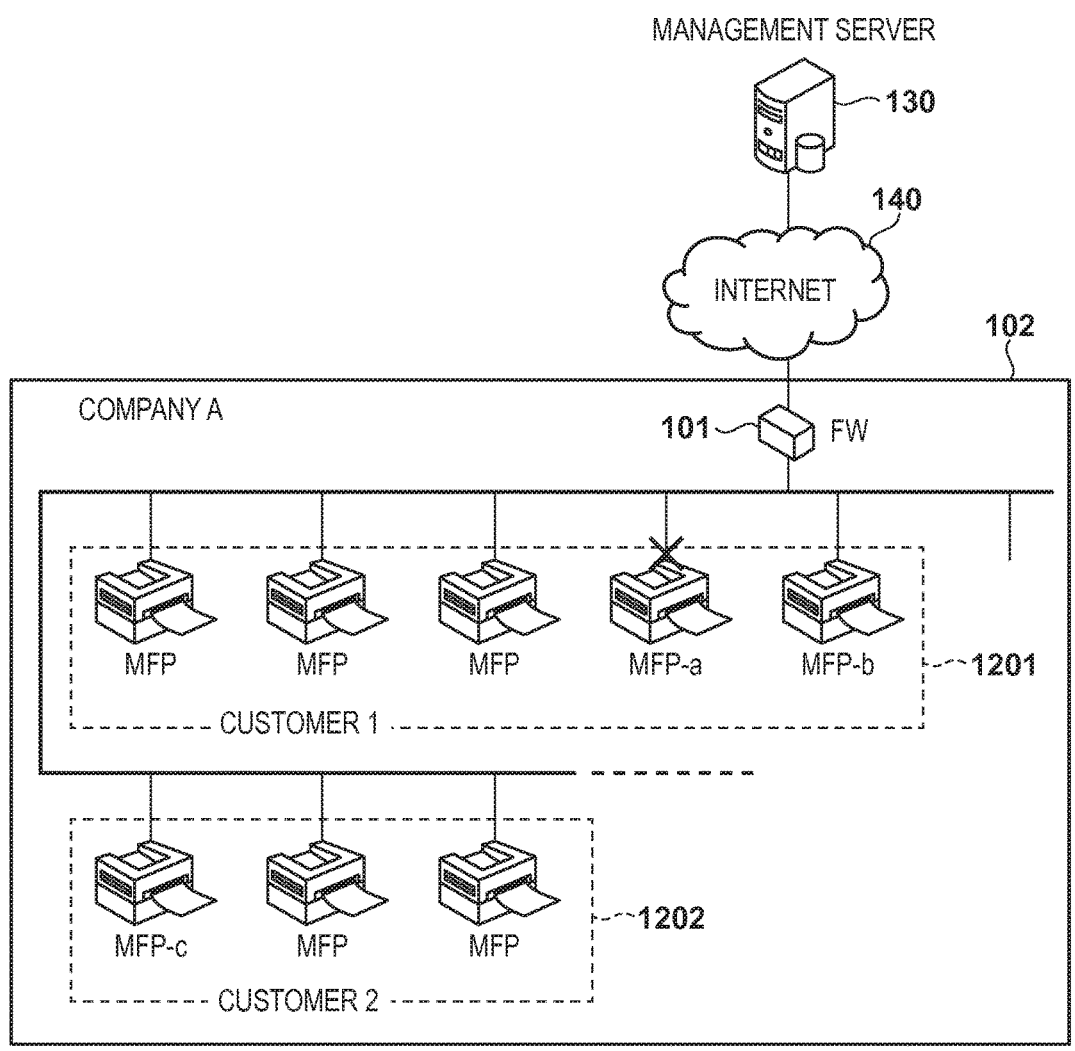
FIG. 12 is a view for showing an example of a system configuration according to a second embodiment.

FIG. 12 is a view for showing an example of a system configuration according to a second embodiment.

For MFP groups that are management targets of the management server 130 a customer 1 (1201), and customer 2 (1202) of company A 102 are registered and managed. In this way, in a large business, there are many MFP that are arranged section units and building units within the firewall 101, and there are cases in which their administrators also differ. Therefore, by registering an MFP according to its installation location and its management of the MFP, the management server 130 can know the administrator is the same for different MFPs and the management server 130 can know if different MFPs are in the vicinity of each other.

In the second embodiment, in a case when an MFP-a of customer 1 is down due to an abnormality, a remote support request from an MFP-b of the same customer is handled as though it were in the same state as is the MFP-a, and thereby the connection with the MFP-b is prioritized. Also, for a remote support request from an MFP-c of another customer 2 for which no problems are occurring, the state is considered to be normal, and in a case when the number of connections of the relay server 120 is under pressure, the priority of such a connection is lowered.

As explained above, by the second embodiment the relay server 120 is able to control priority of support appropriately by investigating the state of another MFP that falls under the group of the MFP that issued a connection request.

Note that in the second embodiment, conditions of occurrence codes in FIG. 13C were made to be errors and frequent occurrence of jams; however, when performing a search for an MFP other than for the current MFP, separate priority conditions may be provided. For example, in such a case the priority conditions may be limited to a liquid crystal error indicating that a display unit of an MFP cannot be used, or an error notification of a power supply abnormality. With this, when a connection request is made from an MFP that has no abnormality, it is possible to set a strict connection condition such as treating an MFP within the vicinity for which an abnormality is occurring as being unable to perform a remote support request.

As explained above, by the second embodiment it is possible for the relay server 120 to use management information of an MFP managed by the management server 130, and flexibly control a priority for connection requests from something other than the MFP 100 conditionally.

Third Embodiment

Next, an explanation will be given for a third embodiment of the present invention. In the third embodiment, by changing the content of device information sent to a relay server by the management server 130, the relay server 120 changes the number of connected units and the ratio of connection requests from the MFP 100 in which an abnormality is occurring. Note that since the configurations of the MFP 100, the PC 110, the relay server 120, and the management server 130 according to the third embodiment are the same as in previously described in the first embodiment, an explanation of these will be omitted.

FIG. 14 is a figure showing a graph of a tally of the number of errors occurring in MFP groups managed by the management server 130 according to the third embodiment.

Figure 14A:
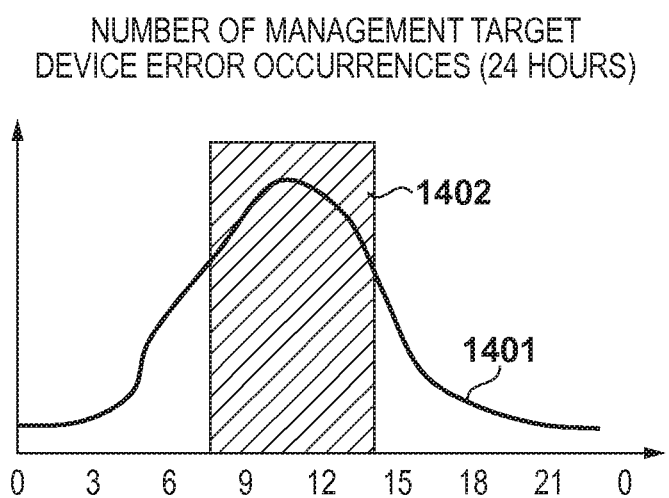
FIG. 14A and FIG. 14B are figures showing a graph of a tally of a number of errors which are generated on the MFP group which the management server according to the third embodiment manages.
Figure 14B:
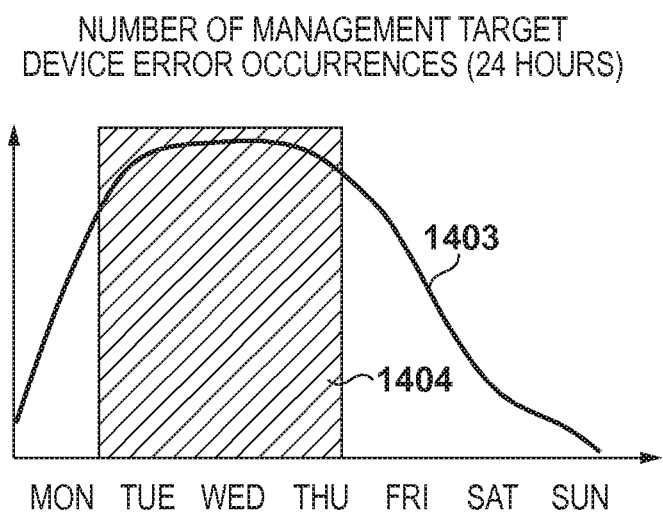

Reference numeral 1401 of FIG. 14A shows a number of errors occurring in one day (24 hours) of each area. An approach of tallying may be to tally various conditions such as an average of a previous day, a previous week, and each day and the like. Reference numeral 1403 of FIG. 14B shows a number of errors which occur for each day of a 1 week period. An approach to tallying can be tallying according to conditions such as tallying only for the previous week, or tallying an average of several months in the past or the like.

In a remote support service, there are cases where connections are requested due to errors occurring, and there is a possibility that the relay server 120 will be overloaded on a day and a time period where many errors are occurring. So, based on a past error occurrence situations, time periods (1402, 1404) during which overloading will occur are predicted, and in such time periods a connection priority from a normal MFP is lowered, while a connection request from an MFP in which an abnormality is occurring is prioritized.

Figure 15:
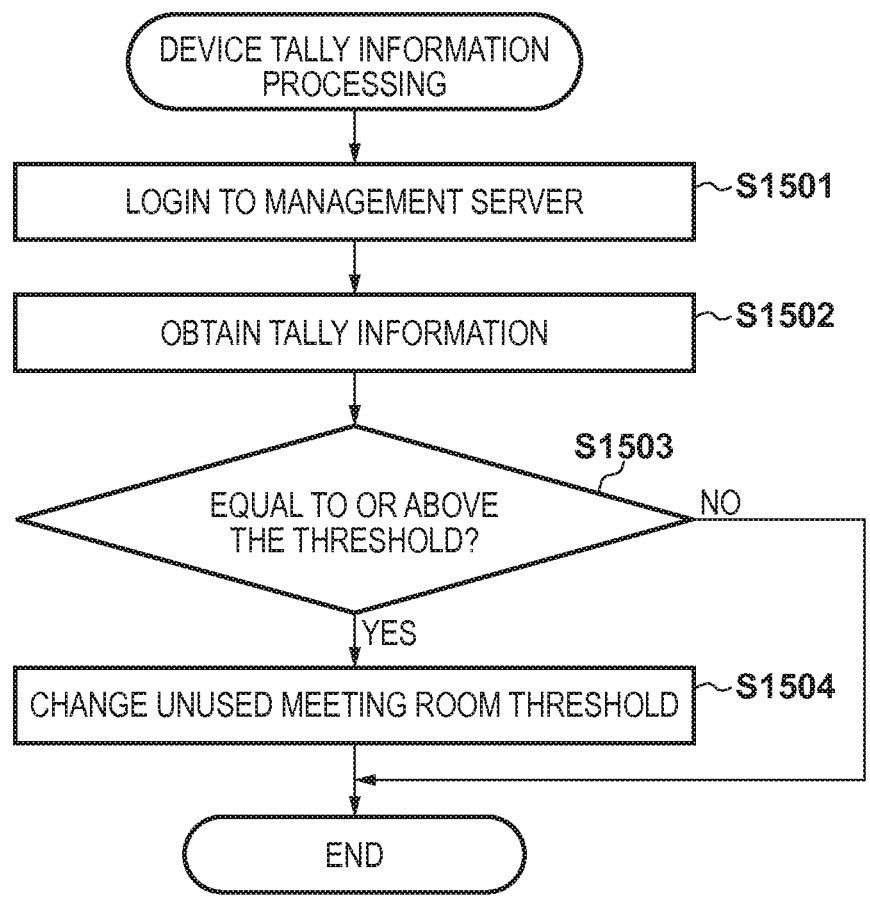
FIG. 15 is a flowchart for describing processing of the relay server according to the third embodiment.

FIG. 15 is a flowchart for describing processing of the relay server 120 according to the third embodiment. Note that each operation (step) shown in this flowchart is realized by the CPU 311 of the relay server 120 executing a control program that was loaded into the RAM 313.

Firstly, in step S1501, the CPU 311 of the relay server 120 (hereinafter referred to as the CPU 311) logs in to the management server 130. For this login, a login upon a search request of the previously described MFP 100 can be substituted, or login may be performed only to perform this tally processing. Next the processing proceeds to step S1502 and the CPU 311 obtains tally information from the management server 130. Next the processing proceeds to step S1503 and the CPU 311 extracts the time period in which a fixed number of errors is occurring from the tally information obtained in step S1502 (1402, 1404). Here, a predetermined number of errors is set in advance to a number of errors threshold table of FIG. 13E. In FIG. 13E, the period and the number of errors of the threshold are stored. In FIG. 13E, a parameter zero is set as a daily unit, and the number of errors "800" in one day is set as the threshold.

Accordingly, in this example, in step S1503, when a time period is extracted from the tally information during which 800 or more errors occur in one day, the processing proceeds to step S1504. In step S1504 the CPU 311 sets the threshold set by the unused meeting room threshold of FIG. 13A to be temporarily larger for the corresponding time period. With this, for a time period in which a number of errors occurring exceeds the threshold, since a larger number of unused resources is taken, it is possible to reject requests for remote support from MFPs 100 for which an error is not occurring more than normal. With this, it is possible to ensure many resources beforehand for an MFP for which an error is occurring, resulting in many of the number of connections of the MFP for which an error is occurring being taken.

In the third embodiment, an example of an error occurring was given; however, anything that is tally information that can be managed by the management server 130, such as a frequent occurrence of paper jams, or a time during which a power supply is turned on for many MFP units, and is information which the relay server 120 can use as connection control information may be used.

As explained above, by the third embodiment it is possible for the relay server 120 to use the tally information of the management server 130 to secure more connection requests from the MFP 100 for which a problem is occurring.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-121851 filed on Jun. 12, 2014, which is hereby incorporated by reference herein in its entirety.

What is claimed is:

1. A communication system including a first terminal, a second terminal, a relay server operable to relay between the first terminal and the second terminal, and a management server operable to manage the first terminal, the relay server comprises:
   a requesting unit configured to generate a search condition in accordance with a connection request from the first terminal, and to request so that the management server searches for a state of the first terminal;

a first transmitting unit configured to, when device information of the first terminal which is transmitted from the management server in response to the request by the requesting unit is obtained, generate relay information and transmit the relay information to the first terminal; and a control unit configured to control communication between the first terminal and the second terminal in accordance with the relay information, and the management server comprises:

a notifying unit configured to search for state information of the first terminal in accordance with the search condition requested by the requesting unit, and to communicate the state information to the relay server as the device information; and a second transmitting unit configured to, in accordance with receiving the relay information from the first terminal, transmit the relay information to the second terminal, and wherein the second terminal performs a communication for remote support for the first terminal via the relay server.

2. The communication system according to claim 1, wherein the search condition includes a condition whereby only the first terminal is made to be a search target, or includes a condition whereby the a group including the first terminal is made to be a search target.

3. The communication system according to claim 1, wherein the search condition includes a priority which is in accordance with the state of the first terminal.

4. The communication system according to claim 1, wherein the management server notifies the relay server, in a case where the first terminal requested by the requesting unit is not a management target, that the first terminal is not a target device, and wherein the relay server, in a case where it is set such that a terminal that is not the management target is prioritized, generates relay information of the first terminal and transmits the relay information to the first terminal.

5. The communication system according to claim 1, wherein the device information includes device information that is at least a number that corresponds to a number of the search condition, or a number smaller than that number.

6. The communication system according to claim 1, wherein the requesting unit of the relay server, when a meeting room connection request is received from the first terminal, requests so that the management server searches for the state of the first terminal in a case where a number of unused meeting rooms is greater than a threshold.

7. The communication system according to claim 6, further comprising: a setting unit configured to set the threshold to be larger in a time period in which a number of errors that occur on the first terminal which the management server manages is greater than a predetermined number.

8. A method of controlling a communication system including a first terminal, a second terminal, a relay server operable to relay between the first terminal and the second terminal, and a management server operable to manage the first terminal, the relay server generates a search condition in accordance with a connection request from the first terminal, and requests so that the management server searches for a state of the first terminal;

when device information of the first terminal which is transmitted from the management server in response to the request is obtained, generates relay information and transmits the relay information to the first terminal; and controls communication between the first terminal and the second terminal in accordance with the relay information, and the management server searches for state information of the first terminal in accordance with the requested search condition with, and communicates the state information to the relay server as the device information; and in accordance with receiving the relay information from the first terminal, transmits the relay information to the second terminal, and wherein the second terminal performs a communication for remote support for the first terminal via the relay server.

* * * * *